(No Model.) 2 Sheets—Sheet 1.

J. A. BACHMAN & F. S. CLARK.
APPARATUS FOR HANDLING SEED COTTON.

No. 507,773. Patented Oct. 31, 1893.

WITNESSES:
C. E. Ashley
H. W. Lloyd.

INVENTORS:
Joseph A. Bachman and
Frank S. Clark,
By their Attorneys,
Arthur C. Fraser & Co.

(No Model.) 2 Sheets—Sheet 2.
J. A. BACHMAN & F. S. CLARK.
APPARATUS FOR HANDLING SEED COTTON.
No. 507,773. Patented Oct. 31, 1893.
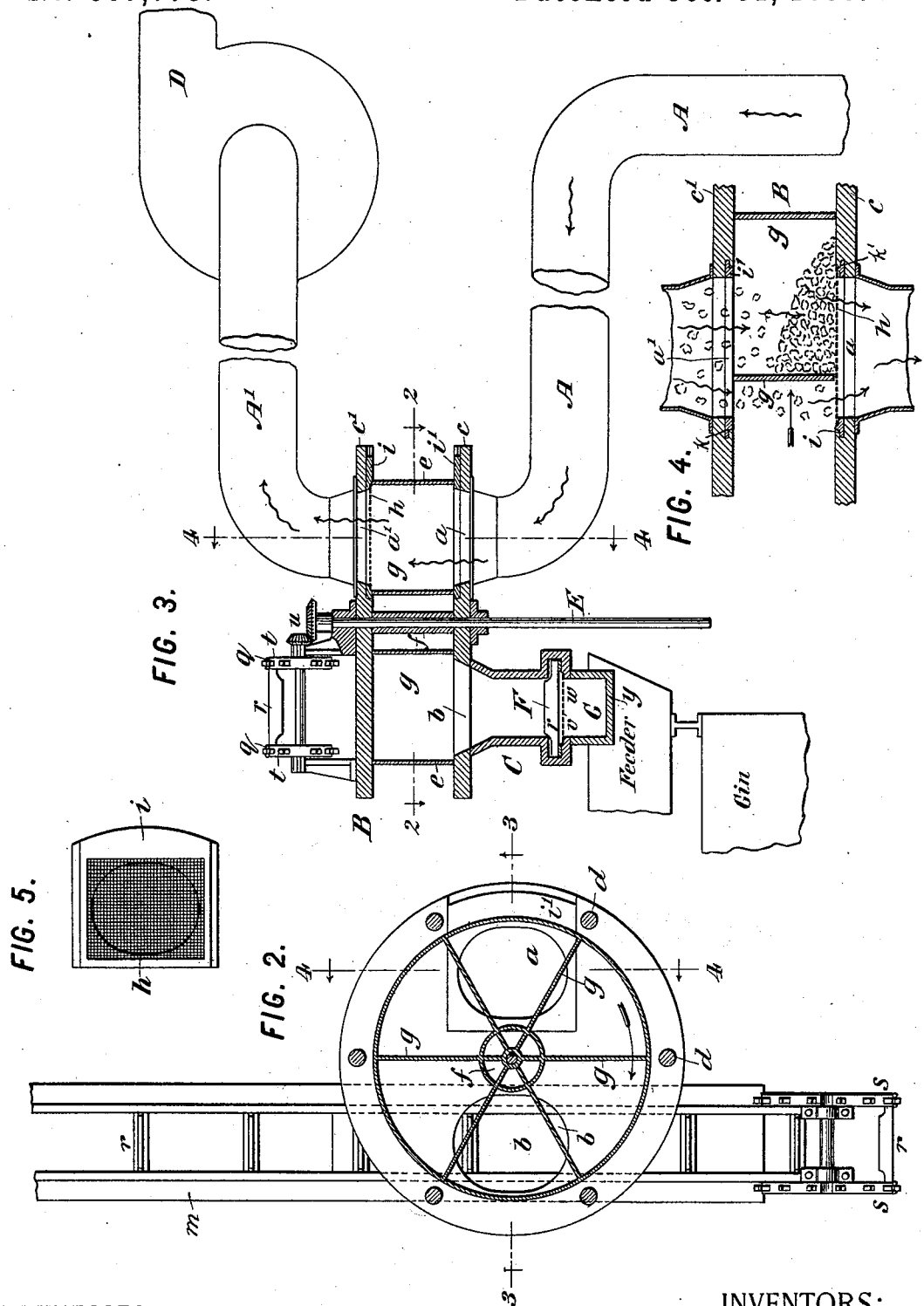
WITNESSES:
C. E. Ashley
H. W. Lloyd.
INVENTORS:
Joseph A. Bachman and
Frank S. Clark,
By their Attorneys,
Arthur C. Fraser & Co.

UNITED STATES PATENT OFFICE.

JOSEPH A. BACHMAN AND FRANK S. CLARK, OF AUSTIN, TEXAS.

APPARATUS FOR HANDLING SEED-COTTON.

SPECIFICATION forming part of Letters Patent No. 507,773, dated October 31, 1893.

Application filed April 4, 1893. Serial No. 469,012. (No model.)

*To all whom it may concern:*

Be it known that we, JOSEPH A. BACHMAN and FRANK S. CLARK, citizens of the United States, and residents of Austin, in the county of Travis and State of Texas, have invented certain new and useful Improvements in Apparatus for Handling Seed-Cotton, of which the following is a specification.

This invention provides an improved apparatus in the nature of a cotton elevator, separator and distributer, for carrying seed cotton from a delivery wagon or storage compartment, freeing it of loose dirt or sand, and delivering it to the feeders by which the gins are kept supplied.

Our improved apparatus comprises a pneumatic cotton-conveying tube by which the cotton is lifted or carried to the distributer, a separator for removing the cotton from the air current, and a distributer comprising a trunk for receiving the cotton from the separator extending over the two gin feeders, having openings delivering into the feeders, and an endless chain conveyer moving in said trunk, causing the cotton to travel along therein and drop out therefrom through the delivery openings into the feeders.

The nature of our improvements will be hereinafter set forth.

Figure 8:
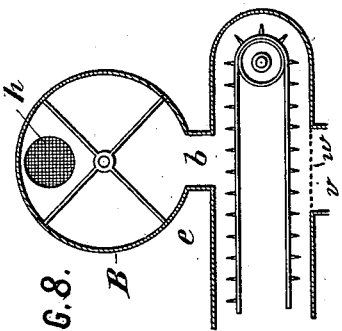
Figure 7:
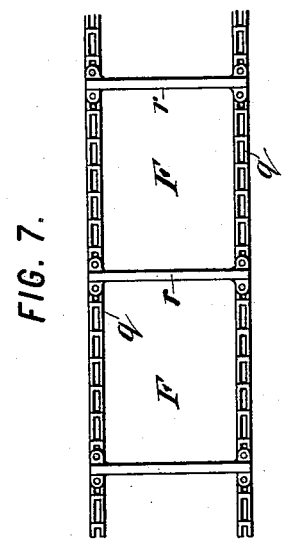
Figure 6:
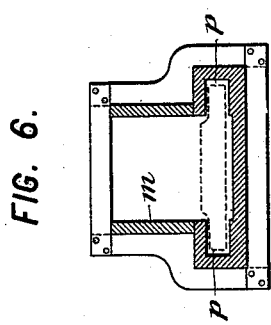
Figure 1:
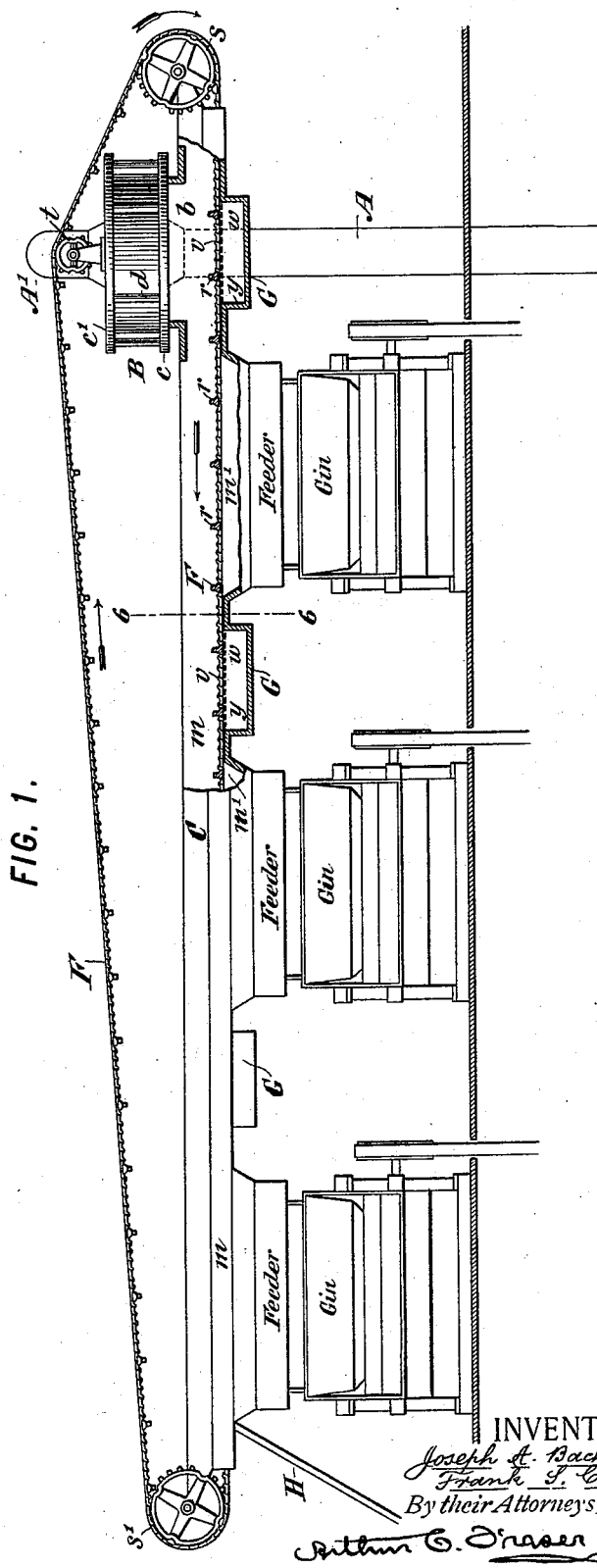

Referring to the accompanying drawings, Figure 1 is a front elevation of a row of gins and feeders showing our improved apparatus for supplying them, the distributer trunk being partly in section. Fig. 2 is a plan of the distributer, the separator being shown in horizontal section on the line 2—2 in Fig. 3. Fig. 3 is a vertical transverse section on the line 3—3 in Fig. 2. Fig. 4 is a fragmentary transverse section through the separator on the lines 4—4 in Figs. 2 and 3, and differing from Fig. 3 in showing the air current passing downwardly instead of upwardly. Fig. 5 shows the screen slide of the separator removed. Fig. 6 is a transverse section through the distributer trunk on the line 6—6 in Fig. 1. Fig. 7 is a fragmentary plan of the distributer chain or conveyer. Fig. 8 is a fragmentary elevation showing a modification.

Let A designate the pneumatic cotton-conveying tube, B the separator, and C the distributer. The cotton-conveying tube A leads from any place whence cotton is to be taken, passes into the casing of the separator B, and from the opposite side of the casing extends as a tube A' to the suction-fan D by which the air current is maintained (see Fig. 3).

The separator B serves to separate the cotton carried through the tube A from the air blast, and deliver the cotton to the distributer C. In the construction shown the separator consists of a casing having on one side of its axis air inlet and outlet openings $a$ $a'$, and on the other side a cotton delivery opening $b$. The air openings $a$ $a'$ communicate with the pipes A A', while the opening $b$ communicates with the distributer. The separator casing consists of a bottom plate $c$ and a top plate $c'$, spaced apart by suitably arranged posts $d$ $d$, and an outer shell or wall $e$. Through the middle of the separator casing passes a vertical shaft E, on which is fixed a hub $f$ having radial plates, wings or sweeps $g$ $g$ fixed to it, so that as the shaft is turned these plates shall revolve or sweep around between the top and bottom plates of the casing and over the openings $a$ $a'$ $b$. The outer wall $e$ is shown as fastened to the sweeps $g$ $g$ so that it revolves with them, but it may be stationary if preferred, the sweeps turning within it. As the air current ascends through the separator casing the cotton is caught on a screen $h$, of wire cloth, or perforated sheet metal or other foraminous material which does not obstruct the passage of the air. As the sweeps $g$ $g$ revolve they sweep off the cotton from the screen and carry it out of the air current, whereupon the cotton falls off on to the lower side or floor of the casing, and is swept into the opening $b$ through which it falls to the distributer.

A novel feature of our invention consists in the construction of the screen $h$ to be applicable to either the upper opening $a'$ or the lower opening $a$. In Fig. 3 it is shown as applied to the upper opening, and in Fig. 4 to the lower opening. This construction admits of the air current being passed through the separator either upwardly or downwardly as circumstances may require. To admit of the ready application of the screen to either opening, it may advantageously be mounted upon a sliding frame $i$, shown removed in Fig. 5, which is slipped into a dovetailed or otherwise grooved or undercut seat or socket $k$ in the bottom $c$, or $k'$ in the top $c'$ of the casing. In order to fill this depressed seat or socket when the screen frame is applied to the opposite socket, an auxiliary frame $i'$ is provided, which upon the removal of the screen frame from either position is thrust into its place. By this means the sweeps $g$ may be made a close fit with both the top and bottom surfaces of the casing whichever be the position of the screen, as clearly shown in Fig. 4, wherein the operation of the sweeps in pushing the accumulated cotton off from the screen is indicated.

The distributer C consists of a trough-shaped trunk $m$, the construction of which is best shown in the transverse view Fig. 6, and an endless conveyer chain F traveling in this trunk. The trunk communicates through the opening $b$ with the separator B, and extends thence over the series of gin feeders. Over each feeder the bottom of the trough is interrupted forming an opening $m'$, one of which is shown in Fig. 1. The trough-shaped trunk is formed with closed sides, and at or near its bottom on opposite sides is laterally widened to form grooves or ways $p$, $p$, (Fig. 6,) in which may travel the two opposite chains $q$ $q$ (Fig. 7) of the conveyer. The conveyer consists of these two chains, (which may be of any suitable construction, or might be substituted by belts of other suitable flexible connectors) and cross-bars or pushers $r$ $r$ arranged at intervals with their ends attached to the respective chains and leaving free openings between the bars. The chain conveyer F is extended between sprocket-wheels $s$ $s'$ at opposite ends, these wheels being made double to carry the two chains of the conveyer, and is carried over the top of the separator B on an additional pair of sprocket-wheels $t$. Power may be communicated either to one of the pairs of sprocket-wheels $s$ or $s'$, or to the shaft E, which is geared by bevel-gears $u$ to the sprocket-wheels $t$ $t$, so that whether the chain conveyer be driven from the separator or vice versa, the two operate at proportionate speeds. By the construction of the ways $p$ for the chains $q$ the latter are kept out of contact with the mass of cotton in the trunk; and by leaving free openings between the bars $r$ the cotton may fall unobstructedly into any opening through the bottom of the trunk. The bottom of the distributer trunk $m$ is formed in advance of each opening $m'$ with an opening $v$, in which is fitted a sieve bottom or screen $w$ constituting a cotton cleaner G. Beneath the opening a dirt-box $y$ is arranged to catch the loose dirt from the cotton that falls through the sieve bottom. The first cleaner G is arranged directly beneath the opening $v$, so that the cotton as it falls into the conveyer trunk falls on the first sieve bottom and the greater part of its loose dirt is here separated from it and sifted down through the bottom into the box $y$.

The operation of the apparatus is as follows:—The bottom end of the pneumatic tube A being dropped into or made to communicate with a mass of seed cotton in a wagon, storage compartment or elsewhere, and the fan and other apparatus being set in motion, cotton is drawn up by the air current into the separator B, where it lodges against the screen $h$. A large portion of the loose dirt is drawn through the screen and carried away by the air-blast. The cotton is pushed off the screen by the sweeps $g$ which serve not only to remove the cotton from this screen, but to cut off the air current from the opening $b$, so that the cotton after being swept past the openings $a$ $a'$ is no longer affected by the air current, and is pushed around within the separator casing until it is dropped through the opening $b$ into the distributer trunk $n$. In falling through this opening onto the first sieve-bottom $w$ the greater part of the remaining loose dirt is separated and sifted through this bottom into the box $y$. By the continued travel of the chain conveyer F, the bars $r$ $r$ push forward the mass of cotton as fast as it falls from the separator, and carry it over the first feeder, into which it falls through the bottom opening $m'$, falling freely through the spaces between the conveyer bars. As soon as this feeder is full, the surplus cotton is carried on over the second cleaner G, which removes a further portion of loose dirt and falls through the second bottom opening $m'$ into the second gin feeder. When this is full, the surplus cotton is again carried forward by the conveyer, any further loose dirt being sifted out by the third cleaner G, and the cotton is fed into the hopper of the third feeder. As fast as each feeder requires more cotton, it falls into it from the distributer, all surplus being carried on toward the next feeder beyond. The excess of cotton beyond what is required to keep all the feeders supplied, falls down an overflow H (Fig. 1) into any suitable storage bin or compartment, whence it may be again drawn when required. Our improved apparatus overcomes the objection of the extreme height to which other systems are compelled to go in order to separate the air from the seed cotton and distribute the latter into the gin feeders. It also admits of using either an upward or a downward current of air through the separator casing, as circumstances may render most desirable. The greater part of the dirt or sand with which the seed cotton becomes charged by contact with the ground, is removed from the cotton before it reaches the gin feeders. These important advantages render our improved apparatus for keeping the gin feeders supplied with seed cotton, practically superior to any other apparatus for this purpose now in use.

Our invention may be modified in many ways without departing from its essential features, as by omitting any parts thereof and using the remainder. For example, the chain conveyer may be substituted by any known form of spiked belt conveyer.

Our invention is not limited to any particular positions of the respective parts, the arrangement of which may be greatly varied within the limits of practicability. For example the separator instead of being arranged horizontally to turn on a vertical axis may be arranged vertically, to turn on a horizontal axis, as shown in Fig. 8, the discharge opening $b$ being made at its lower side through the casing $e$ which in this case is stationary.

We claim as our invention the following-defined novel features or improvements, substantially as hereinbefore specified, namely:

1. The combination with a cotton-conveying pneumatic tube of a separator consisting of a casing having air openings on opposite sides, a stationary screen covering one of said openings, and a revolving sweep for removing the cotton from said screen, the screen constructed to be removable from the casing, and the casing constructed with seats at both said openings for the application of said screen, whereby the screen is adaptable to either opening so that the air current can be made to pass in either direction through the casing.

2. The combination of a cotton-conveying pneumatic tube, a separator-casing having on one side of its axis opposite air inlet and outlet openings, and on the other side of its axis a cotton-delivery opening in its bottom, a screen covering said outlet opening, a revolving sweep for removing the cotton from said screen and intercepting the air-current from the delivery opening, and a distributer consisting of a trunk extending beneath said delivery opening, receiving cotton therefrom, and having openings for discharging cotton, and an endless conveyer moving in said trunk to push the cotton along therein from said delivery opening to the discharge openings.

3. The combination of a cotton-conveying pneumatic tube, a separator for removing the cotton from the air-current, a distributer-trunk receiving cotton from said separator, and having a delivery opening for discharging it to a gin feeder, an endless conveyer moving in said trunk to push the cotton along therein, and a cotton-cleaner consisting of a sieve-bottom in said trunk over which the cotton is pushed before reaching said discharge-opening, whereby the loose dirt is sifted out from the mass of seed-cotton.

4. The combination with a plurality of gins and feeders, of a distributer consisting of a trunk extending over the feeders and having discharge openings delivering thereinto, and an endless conveyer moving through said trunk to push the cotton along to such delivery openings, and of cotton-cleaners consisting of sieve-bottoms in said trunk preceding such delivery openings and dirt boxes beneath the sieves, for sifting the loose dirt from the seed cotton.

5. The combination of a cotton-conveying pneumatic tube, a separator for removing the cotton from the air current having a discharge opening $b$, a distributer-trunk extending beneath said separator, receiving the cotton from said opening, and having delivery openings for discharging it to gin feeders, an endless conveyer moving in said trunk to push the cotton along therein, and a sieve-bottom in said trunk beneath the opening through which the cotton falls from the separator, whereby the loose dirt is separated from the falling cotton and sifted out from the mass of seed cotton through said sieve-bottom.

6. The combination with a cotton-conveying pneumatic tube of a separator B for removing the cotton from the air current, having a revolving shaft E carrying sweeps $g\ g$, and a distributer C consisting of a trunk $m$, and a chain conveyer F traveling through said trunk consisting of successive bars $r\ r$ and chains $q\ q$ carried by sprocket-wheels, and said sprocket-wheels geared to said separator shaft, whereby the separator and distributer operate at proportional speeds.

7. The combination, to form a cotton distributer, of a trunk $m$, sprocket wheels $s\ s'$, and a chain conveyer F traveling through said trunk, consisting of successive transverse bars $r\ r$ with intervening open spaces, and chains $q\ q$ carried by said sprocket wheels.

8. The combination to form a cotton distributer, of a trunk $m$ having lateral grooves or ways $p\ p$ near its bottom, and a chain conveyer F traveling through said trunk, consisting of successive transverse bars $r\ r$ with intervening open spaces, and chains $q\ q$, the latter traveling in said ways, whereby the chains are out of direct contact with the mass of cotton in the trunk.

In witness whereof we have hereunto signed our names in the presence of two subscribing witnesses.

JOSEPH A. BACHMAN.
FRANK S. CLARK.

Witnesses:
A. GIESEN,
C. E. JONES.